US006026554A

United States Patent [19]
Parker

[11] Patent Number: 6,026,554
[45] Date of Patent: Feb. 22, 2000

[54] AUTOMOTIVE FUEL FILLER PIPE HOUSING WITH SNAP-OVER TRIM RING

[75] Inventor: Eric G. Parker, Chicago, Ill.

[73] Assignee: Illinois Tool Works Inc., Glenview, Ill.

[21] Appl. No.: 08/991,215

[22] Filed: Dec. 16, 1997

[51] Int. Cl.[7] .......... B29C 65/58

[52] U.S. Cl. .......... 29/453; 29/458; 220/86.2

[58] Field of Search .......... 29/458, 453; 280/834; 296/97.22; 220/86.3, 86.2

[56] References Cited

U.S. PATENT DOCUMENTS

| | | | |
|---|---|---|---|
| 3,334,779 | 8/1967 | Smith | 220/86.2 |
| 3,616,960 | 11/1971 | Miller | 220/86.2 |
| 4,027,910 | 6/1977 | Farelli . | |
| 4,270,667 | 6/1981 | Neiman . | |
| 4,653,660 | 3/1987 | Shaw | 220/86.2 |
| 5,090,105 | 2/1992 | DeRees . | |
| 5,090,760 | 2/1992 | Wheeler . | |
| 5,118,155 | 6/1992 | Koop | 296/97.22 |
| 5,437,491 | 8/1995 | Nedbal et al. . | |
| 5,533,766 | 7/1996 | Farber . | |
| 5,560,175 | 10/1996 | Soyka, Jr. et al. | 52/716.5 |
| 5,829,495 | 11/1998 | Corfitsen | 220/86.2 |

*Primary Examiner*—S. Thomas Hughes
*Assistant Examiner*—Jermie E. Cozart
*Attorney, Agent, or Firm*—Schwartz & Weinrieb

[57] ABSTRACT

A fuel filler pipe housing mountable on automotive body panels. The housing generally includes a flange member coupled to a body member mountable on a surface of the body panel, and a trim member coupled to the flange member by a hinge. The trim member is movable relative to the flange member between a first position where the trim member is disposed away from a surface of body panel and a second position where the trim member is disposed toward the surface of the body panel, whereby the trim member is biased toward one of the first and second positions. The housing may be installed on the body panel with the trim member positioned away therefrom prior to applying paint thereto, whereafter the trim member is positioned toward the body panel.

21 Claims, 3 Drawing Sheets

10
40
60
44
42
59
30
32
34
46
53
53
24
35
46
23
20
23
20
22
55
56
54
57
36
52
38
60
26
39
54
50
51

56
59
58
57
55
58
54
58
57
55
56
59
58
54
58
59
56
57
58
55
55
58
59
56
58
57

40
36
39
39
60
37
38
37
38
30
34
36
36
38
37
38
39
37
39
36

AUTOMOTIVE FUEL FILLER PIPE HOUSING WITH SNAP-OVER TRIM RING

FIELD OF THE INVENTION

The present invention relates generally to automotive fuel filler pipe housings mountable on automotive body panels, and more particularly to a housing with trim ring members useable for automotive fuel filler pipes.

BACKGROUND OF THE INVENTION

In the automotive industry fuel filler pipe housing assemblies mountable in openings of automotive vehicle body panels are known generally. U.S. Pat. No. 5,437,491 entitled "Fuel Door Housing" issued Aug. 1, 1991 and assigned commonly herewith, for example, discloses a plastic fuel filler pipe housing with a flange portion mountable in an opening of a vehicle body panel, wherein the body panel includes a recessed mounting surface disposed about the opening thereof so that a hinged door of the housing is flush with an outer surface of the body panel. A capped end portion of the fuel filler pipe extends through the housing, and is accessible upon opening the housing door. Other fuel filler pipe housings do not include a hinged door, but merely provide a transition between the fuel filler pipe and the body panel, leaving the fuel cap exposed. The housing may provide some support for the fuel filler pipe, but the capped end portion thereof is designed generally to readily break away from the housing during impact to prevent fuel leakage. The housing may also collect and drain small amounts of fuel spillage during refueling, and may provide some aerodynamic streamlining and cosmetic contouring continuous with the body panel, particularly in passenger vehicles where styling is paramount.

Automotive fuel filler pipe housings are installed generally after painting the automotive body panels so as to ensure that the housing and portions of the automotive body panel proximate the housing accommodating opening therein are painted completely. In some painting operations, the housing is suspended in a window opening of the auto body and painted therewith, then later mounted in the automotive body panel. Suspending the housing from the automotive body for painting, however, must be performed manually and is laborious. And mounting the housing on the body panel after painting poses a risk of damage to the painted finish during installation.

It is therefore generally desirable to install housings on the automotive body panels prior to applying finish coats of paint thereto. Primer coats in original equipment are applied by electro-deposition and baked at temperatures that will damage plastics, and thus plastic housings are installed after application of the primer. Past efforts to install housings before applying finish coats of paint, however, have met with limited success. One problem is a difficulty ensuring complete painting at an interface between the body panel and the housing, especially where the body panel is recessed. Another problem is that under changing temperature conditions, plastics tend to expand and contract at different rates than metal automotive body panels. This phenomenon often results in exposure of unpainted areas of the body panel, and more particularly to portions thereof adjacent the flange member of the housing when the body panel expands relative to the housing. This exposure is highly undesirable from a cosmetic standpoint, particularly where the unpainted portion is not covered by a housing door. Other housings used in other applications suffer from the same or similar problems.

The present invention is drawn generally toward advancements in the art of housings and more particularly to automotive fuel filler pipe housings.

OBJECTS OF THE INVENTION

It is an object of the invention to provide novel housings installable on mounting members, particularly in automotive body panel openings for housing fuel filler pipes, that overcome problems in the prior art.

It is also an object of the invention to provide novel housings useable for automotive fuel filler pipes having a trim member that conforms to mounting member contours, especially automotive body panel contours, and that permit installation of the housing on the mounting member prior to applying paint thereto.

It is a more particular object of the invention to provide novel fuel filler pipe housings installable on automotive body panels. The housing generally comprises a flange member coupled to a body member mountable on the automotive body panel. A trim member is coupled to the flange member by a hinge, wherein the trim member is movable relative to the flange member between a first position away from an exterior surface of the automotive body panel and a second position toward the exterior surface of the automotive body panel, whereby the trim member is biased toward one of the first and second positions.

It is a related object of the invention to provide novel methods for installing fuel filler pipe housings on automotive body panels before applying paint thereto by mounting the housing on the body panel when the trim member is in a first position away from a surface of the body panel, applying paint to at least a portion of the body panel when the trim member is positioned away from the surface thereof, including applying paint to at least a portion of the body panel coverable by the trim member, and then moving the trim member to the second position toward the body panel after painting.

It is another more particular object of the invention to provide novel fuel filler pipe housings installable on automotive body panels, wherein at least a flange member, a hinge, and a trim member thereof are formed of a unitary plastic material, and whereby the trim member is biased toward a first or second position relative to the flange member.

BRIEF DESCRIPTION OF THE DRAWINGS

The foregoing and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators throughout the several views, and wherein.

DETAILED DESCRIPTION OF THE INVENTION

Figure 1A:
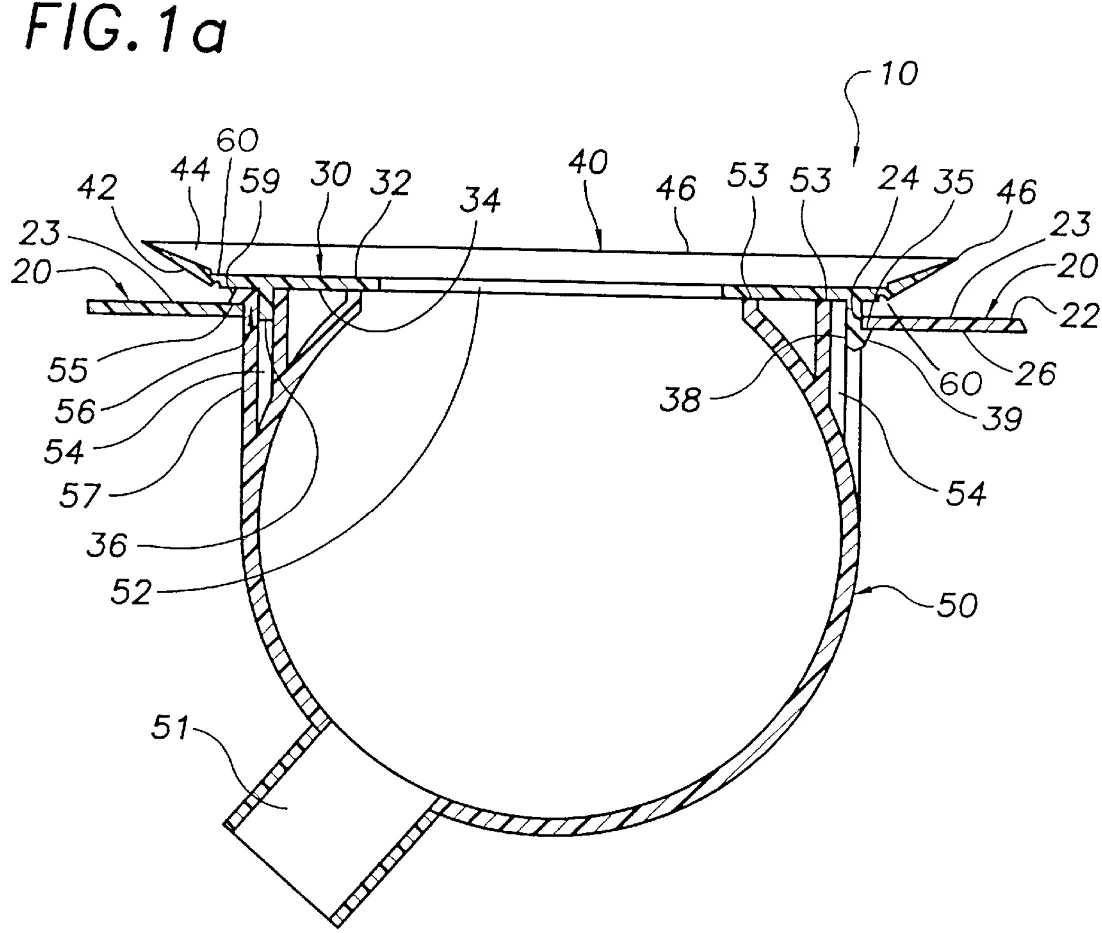
FIG. 1*a* is a partial sectional view of a partially installed automotive fuel filler housing with a trim member according to an exemplary embodiment of the invention.
Figure 1B:
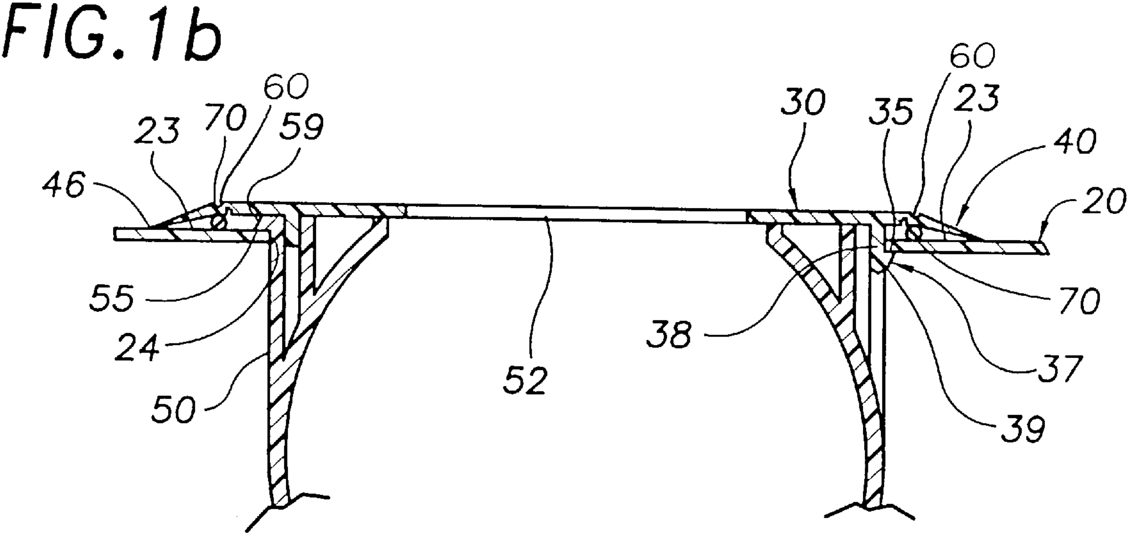
FIG. 1*b* is another partial sectional view of a more completely installed housing with a trim member according to the exemplary embodiment of the invention.

FIGS. 1*a* and 1*b* illustrate a housing 10 mountable on a mounting member 20, and useable for housing fuel filler pipes, not shown, in automotive body panels. The mounting member 20 referenced in the exemplary and preferred embodiments is thus an automotive body panel with an exterior surface 22, but is representative more generally of any mounting member.

Figure 2:
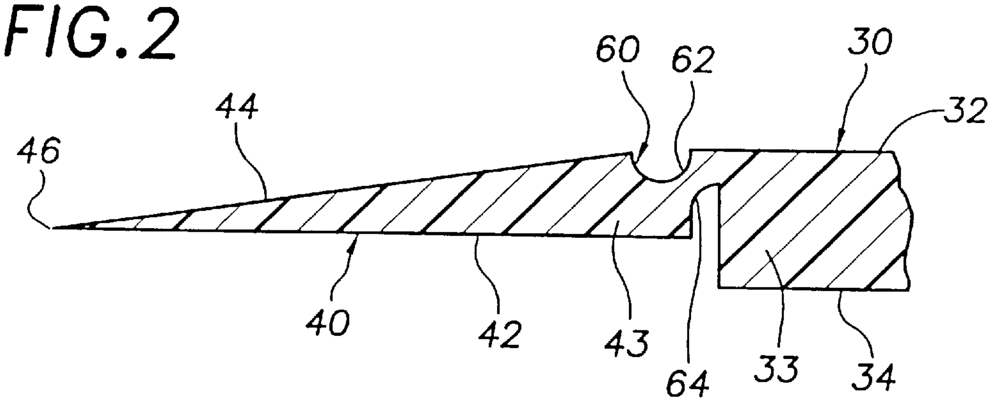
FIG. 2 is an enlarged sectional view of a portion of the trim member of FIGS. 1*a* and 1*b* according to an exemplary embodiment of the invention.

The housing 10 generally comprises a flange member 30, a trim member 40 and a body member 50. The flange member 30 is coupled to the trim member 40 by a hinge 60, as seen in FIG. 2, and is also coupled to the body member 50 to form the housing 10, which is mountable on the automotive body panel 20. The flange member 30 has an exterior side 32 and an interior side 34 facing, or coupleable toward, the automotive body panel 20. The flange member 30 may be mounted directly on the body panel 20, or coupled thereto by the body member 50, or a combination thereof as discussed further below. The exemplary body member 50 has an inlet opening 51 and an outlet opening 52, wherein the body member 50 is at least partially disposable in an opening 24 of the automotive body panel 20.

FIG. 2 illustrates the trim member 40 having an interior side 42, an exterior side 44, and a distal end portion 46. The hinge 60 couples the trim member 40 and the flange member 30, and more particularly couples an inner portion 43 of the trim member 40 with an outer portion 33 of the flange member 30 so that the distal end portion 46 of the trim member 40 extends generally from the flange member 30.

FIGS. 1*a* and 1*b* illustrate the trim member 40 movable relative to the flange member 30 between a first position where the distal end portion 46 of the trim member 40 is positioned generally away from the flange member 30 as shown in FIG. 1*a,* and a second position where the distal end portion 46 of the trim member 40 is positioned generally toward the flange member 30 as shown in FIG. 1*b*. In the exemplary embodiment, the distal end portion 46 of the trim member 40 is disposed axially beyond the exterior side 32 of the flange member 30 when the trim member 40 is in the first position, and the distal end portion 46 of the trim member 40 is disposed substantially radially about the flange member 30 when the trim member is in the second position.

FIG. 1*a* illustrates the housing 10 installed partially on the automotive body panel 20 with the trim member 40 in the first position so that paint may be applied to at least a portion of the exterior surface 22 of the automotive body panel 20. According to this aspect of the invention, paint is applied to at least portions 23 of the automotive body panel exterior 22 subsequently coverable by the trim member 40 in the second position. FIG. 1*b* illustrates the trim member 40 moved to the second position toward the automotive body panel 20 after applying paint thereto, whereby the painted portions 23 of the exterior surface 22 are covered by the trim member 40. The trim member 40 and automotive body panel 20 may thus expand and contract at different rates without exposing any unpainted areas of the automotive body panel exterior surface 22 that would otherwise be exposed during relative expansion and contraction therebetween if the automotive body panel 20 and trim member 40 were painted with the trim member 40 in the second position.

Figure 4:
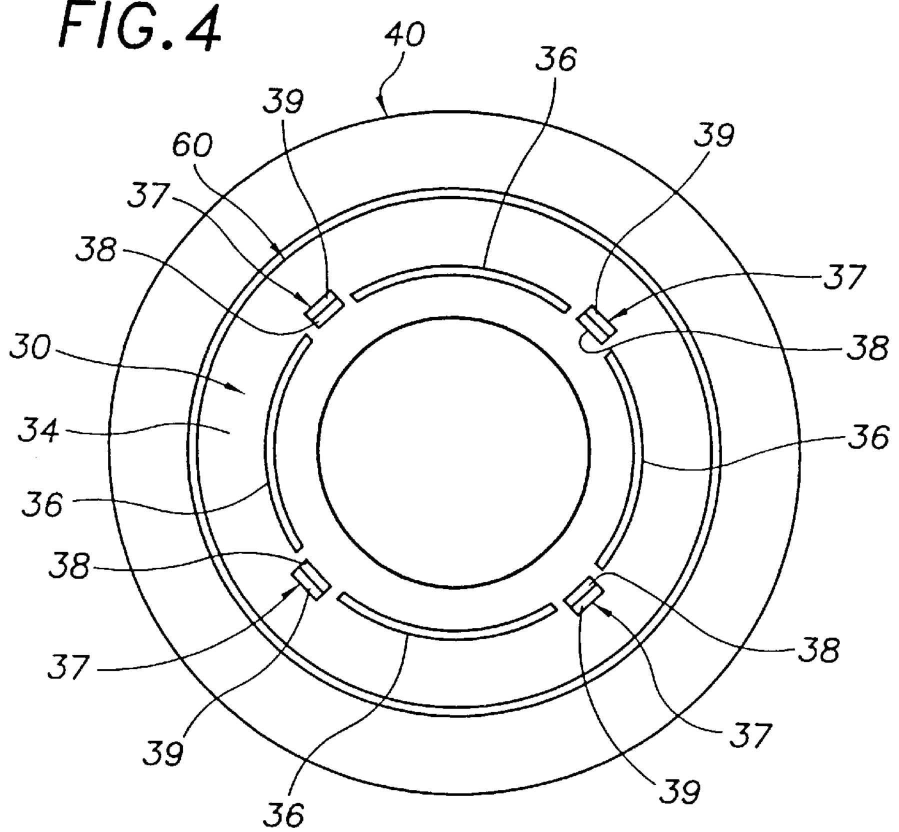
FIG. 4 is interior side plan view of the exemplary trim member of FIGS. 1*a* and 1*b*.

FIG. 4 illustrates the trim member 40 and hinge 60 both having an annular ring shape disposed about a portion of the flange member 30. In alternative embodiments, however, the trim member 40 is substantially ring shaped having an oval or other closed ended shape. The hinge 60 does not necessarily have the same shape as the trim member 40, which may be shaped irregularly to follow the contours of the body panel 20. Still more generally, the trim member 40 is not closed ended, and may have a curved or a linear edge defined by the distal end portion 46 thereof, thereby forming a flap movable between the first and second positions discussed above.

FIGS. 1*a,* 1*b* and 2 illustrate the hinge 60 formed partially by a first recess 62 disposed between the trim member 40 and the flange member 30 on the exterior sides thereof, and partially by a second recess 64 disposed between the trim member 40 and the flange member 30 on the interior sides thereof, whereby the trim member 40 is biased in one of the first and second positions and snaps flexibly therebetween.

The hinge 60 in the exemplary embodiments is continuous and close ended, but in alternative embodiments the hinge may comprise a plurality of discrete components, which are not continuous. In embodiments having open-ended trim members with a linear or curved edge defined by the distal end portion 46 thereof, the hinge 60 must generally be curved as it is defined between the flange member 30 and the trim member 40, thereby providing the snapping action required to bias the trim member in one of the first and second positions as discussed above.

The hinge 60 is preferably formed of a flexible resilient material, whereby the trim member 40 is biased toward one of the first and second positions. In one embodiment, the flange member 30, the trim member 40 and the hinge 60 are a unitary member, which may be formed of a plastic material in a molding operation. Molding the trim member 40 in one of the first and second positions relative to the flange member 30 will bias the trim member 40 in one of the first and second positions and provide the desired snap action therebetween.

FIG. 1*a* illustrates the interior side 42 of the trim member 40 in the first position disposed away from the exterior surface 22 of the automotive body panel 20, and FIG. 1*b* illustrates the interior side 42 of the trim member 40 in the second position disposed toward the exterior surface 22 of the automotive body panel 20, whereby the trim member 40 provides a continuous interface between the flange member 30 and the automotive body panel 20. The bias of the trim member 40 in the second position toward the automotive body panel 20 also provides a tight fit that conforms with body panel 20 contours without gaps or spaces between the trim member 40 and the body panel 20, thereby providing a high quality styled finish, which is essential in most markets, particularly the passenger motor vehicle markets. FIG. 1*b* also illustrates a sealing member 70 disposed along the interior side 42 of the trim member 40 and the exterior surface 22 of the automotive body panel 20 to provide a seal therebetween.

FIGS. 1*a* and 1*b* illustrate the body member 50 coupled to the automotive body panel 20, and FIGS. 1*a,* 1*b,* and 3 illustrate a plurality of resilient engagement members 56 protruding from the body member 50 and disposed about the outlet opening 52 thereof. The plurality of resilient engagement members 56 are generally engageable with the automotive body panel 20 so as to couple and retain the body member 50 at least partially in the opening 24 thereof. The resilient engagement members 56 include a stem portion 57 formed by adjacent recesses 58 in the body member 50, and a bevelled edge 59 engageable with the opening 24 of the automotive body panel 20 so as to flex the stem 57 inwardly, which permits installation of the body member 50 in the opening 24 thereof. FIG. 1*a* illustrates an engagement portion 55 of the resilient engagement members 56 seated on the exterior surface 22 of the automotive body panel 20 when the body member 50 is installed in the opening 24 thereof.

The resilient members 56 are preferably breakable under predetermined stress and strain conditions so as to separate the housing 10 from the automotive body panel 20 during impacts as required by governmental and industry fuel system safety regulations and standards. In the exemplary embodiment, the body member 50 and the plurality of resilient engagement members 56 are a unitary member, which is preferably formable from a plastic material in a molding operation. The dimensions and number of plastic material resilient members 56 may be designed to break or fail under predetermined stress and strain conditions occurring during impact with accurate predictability, which is necessary to comply with fuel system safety regulations and standards.

Figure 3:
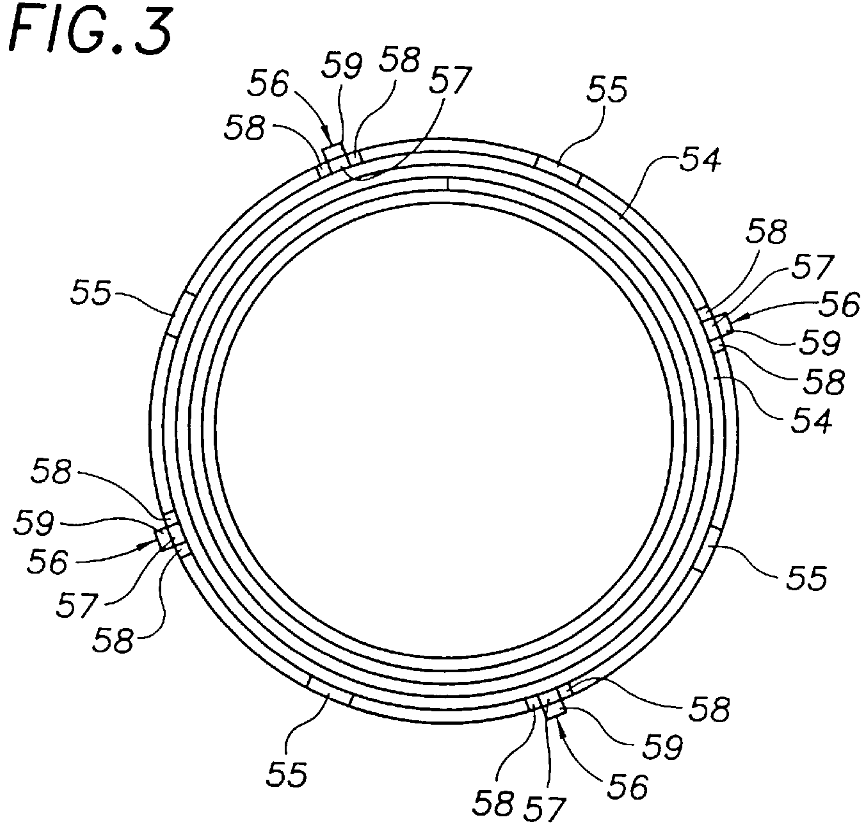
FIG. 3 is an end plan view of the body member of FIGS. 1*a* and 1*b*.

FIG. 4 illustrates a plurality of curved flange portions 36 and a plurality of resilient tab members 37 protruding from the interior side 34 of the flange member 40 30. And FIGS. 1*a* and 1*b* illustrate one of the curved flange members 36 disposable in a recess 54 formed on an end portion 53 of the body member 50 when the flange member 30 is coupled thereto. FIG. 3 illustrates a continuous recess 54 disposed in the end 53 of the body member 50, and in an alternative embodiment the recess 53 may be a plurality of discrete recesses corresponding to the curved flange portions 36.

The resilient tab members 37 of the flange member 30 are generally engageable with the opening 24 in the automotive body panel 20 so as to retain the flange member 30 coupled thereto and to retain the flange member 30 assembled to the body member 50. FIGS. 1*a*, 1*b* and 4 illustrate the resilient tab members 37 having a resilient stem 38 and a bevelled surface 39 engageable with the opening 24 in the automotive body panel 20 so as to inwardly flex the resilient tab members 37 as the flange member 30 is disposed therethrough and possibly assembled with the body member 50, which is preferably mounted therein previously as discussed above. The resilient tab members 37 also include a surface portion 35 engageable with the interior side 26 of the automotive body panel 20 so as to retain the flange member 30 in assembly therewith and with the body member 50. The curved flange members 36 of the flange member 30 also prevent the resilient engagement members 56 of the body member 50 from flexing inwardly and disengaging from the automotive body panel 20. The body member 50 includes recesses 55 on the end portion 53 thereof to accommodate the resilient tab members 37 of the flange member 30.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The present invention is therefore to be limited not by the specific exemplary embodiments disclosed herein but by all embodiments within the scope of the appended claims.

What is claimed is:

1. An automotive fuel filler pipe housing mountable upon an automotive body panel having an exterior surface, comprising:

a flange member having an exterior side, an interior side, and means for mounting said flange member upon the exterior surface of the automotive body panel;

a trim member connected to said flange member and having an interior side, an exterior side, and a distal end portion; and hinge means connecting said trim member to said flange member for permitting said trim member to be movable relative to said flange member between a first position at which said distal end portion of said trim member is positioned away from the exterior surface of the automotive body panel when said flange member is mounted upon the automotive body panel, and a second position at which said distal end portion of said trim member is positioned toward the exterior surface of the automotive body panel when said flange member is mounted upon the automotive body panel such that said distal end portion of said trim member is engaged with the exterior surface of the automotive body panel.

2. The housing member of claim 1, the distal end portion of the trim member in the first position is disposed axially beyond the exterior side of the flange member, and the distal end portion of the trim member in the second position is disposed substantially radially about the flange member.

3. The housing of claim 1, the trim member is substantially ring shaped and is disposed about a portion of the flange member.

4. The housing of claim 1, the flange member, the hinge, and the trim member are formed of a unitary plastic member.

5. The housing of claim 4, the hinge is formed partially by a first recess between the trim member and the flange member on the exterior sides of the flange member and the trim member, and the hinge is formed partially by a second recess between the trim member and the flange member on the interior sides of the flange member and the trim member, whereby the trim member snaps between the first position and the second position.

6. The housing of claim 1, the hinge is curved and is formed of a flexible resilient material, whereby the trim member is biased toward one of the first position and the second position.

7. The housing of claim 1 further comprising a sealing member disposed along the interior side of the trim member.

8. The housing member of claim 1 further comprising a body member having an outlet opening, the body member at least partially disposable in an opening of the automotive body panel, the flange member coupled to the body member.

9. The housing of claim 8 further comprising a plurality of curved flange portions and a plurality of resilient tab members protruding from the interior side of the flange member, the curved flange members disposable in a recess formed on an end portion of the body member when the flange member is coupled to the body member, and the resilient tab members engageable with the opening in the automotive body panel to retain the flange member coupled to the body member.

10. The housing of claim 8 further comprising a plurality of resilient engagement members protruding from the body member and disposed about the outlet opening of the body member, the plurality of resilient engagement members engageable with the automotive body panel to mount the body member at least partially in the opening of the automotive body panel.

11. The housing of claim 1, wherein:

said interior side of said flange member is disposed toward said exterior surface of said automotive body panel.

12. A housing mountable upon a mounting member having an exterior surface and useable for housing a fuel filler pipe in an automotive body panel, comprising:

a flange member having an exterior side, an interior side, and means for mounting said flange member upon the exterior surface of the mounting member;

a trim member mounted upon said flange member and having an interior side, an exterior side, and a distal end portion; and hinge means coupling said trim member to said flange member for permitting said trim member to be movable relative to said flange member between a first position at which said distal end portion of said trim member is disposed axially beyond said exterior side of said flange member so as to be positioned away from the exterior surface of the mounting member when said flange member is mounted upon the mounting member, and a second position at which said distal end portion of said trim member is disposed substantially radially with respect to said flange member so as to be positioned toward the exterior surface of the mounting member when said flange member is mounted upon the mounting member such that said distal end portion of said trim member is engaged with the exterior surface of the mounting member.

13. The housing of claim 12, the trim member is substantially ring shaped and is disposed about a portion of the flange member.

14. The housing of claim 12, the flange member, the hinge, and the trim member are formed of a unitary plastic member, whereby the trim member is biased toward one of the first position and the second position.

15. A method for mounting a fuel filler pipe housing upon an automotive body panel, said housing having a hinge member interconnecting a flange member to a trim member having an exterior side, an interior side, and a distal end portion, said trim member being movable relative to said flange member between a first position at which said distal end portion of said trim member is disposed axially beyond an exterior side of said flange member, and a second position at which said distal end portion of said trim member is disposed substantially radially with respect to said flange member, comprising the steps of:

moving said trim member to said first position;

coupling an interior side of said flange member to an exterior surface of the automotive body panel when said trim member is disposed at said first position whereby said interior side of said trim member is positioned away from the exterior surface of the automotive body panel; and moving said trim member to said second position after said flange member has been coupled to the exterior surface of the automotive body panel, whereby said interior side of said trim member is positioned toward the exterior surface of the automotive body panel.

16. The method of claim 15 further comprising applying paint to at least a portion of the exterior surface of the automotive body panel when the trim member is in the first position, whereby paint is applied to at least a portion of the exterior of the automotive body panel coverable by the trim member in the second position, and moving the trim member to the second position toward the automotive body panel after applying paint.

17. The method of claim 15 further comprising coupling a body member at least partially in an opening of the automotive body panel before coupling the flange member to the exterior surface of the automotive body panel, and then coupling the flange member to the body member.

18. The method of claim 17 further comprising retaining the body member coupled to the automotive body panel with the flange member.

19. The housing as set forth in claim 5, wherein:

said first and second recesses are radially offset with respect to each other so as to facilitate said trim member maintaining a selected one of said first and second positions when said trim member is selectively respectfully moved to said first and second positions.

20. A method for mounting a fuel filler pipe housing upon an automotive body panel which is to be painted, said housing having a hinge member interconnecting a flange member to a trim member having an exterior side, an interior side, and a distal end portion, said trim member being movable relative to said flange member between a first position at which said distal end portion of said trim member is disposed axially beyond an exterior side of said flange member, and a second position at which said distal end portion of said trim member is disposed substantially radially with respect to said flange member, comprising the steps of:

moving said trim member to said first position;

coupling an interior side of said flange member to an exterior surface of the automotive body panel when said trim member is disposed at said first position whereby said interior side of said trim member is positioned away from the exterior surface of the automotive body panel so as to facilitate the application of paint to the exterior surface of the automotive body panel which includes a portion of the exterior surface of the automotive body panel which is to be covered by said distal end portion of said trim member when said trim member is disposed at said second position;

painting the exterior surface of the automotive body panel including the portion of the exterior surface of the automotive body panel which is to be covered by said distal end portion of said trim member; and moving said trim member to said second position after said flange member has been coupled to the exterior surface of the automotive body panel, and after the exterior surface of the automotive body panel, including the portion of the exterior surface of the automotive body panel which is to be covered by said distal end portion of said trim member, has been painted whereby said distal end portion of said trim member is engaged with the exterior surface of the automotive body panel so as to cover the portion of the exterior surface of the automotive body panel and thereby provide an unbroken painted region upon the exterior surface of the automotive body panel surrounding the fuel filler pipe housing.

21. The method as set forth in claim 20, further comprising the step of:

providing said fuel filler pipe housing with a body member which is mounted within a recessed apertured portion of the automotive body panel.

* * * * *